United States Patent [19]
Battiato

[11] Patent Number: 6,006,403
[45] Date of Patent: Dec. 28, 1999

[54] TRANSFERABLE REPLACEABLE RESILIENT CUSHIONING GRIP FOR USE ON HANDLES

[76] Inventor: Victor Battiato, 2324 E. Indian School Rd., Phoenix, Ariz. 85016

[21] Appl. No.: 09/128,023

[22] Filed: Aug. 3, 1998

[51] Int. Cl.⁶ .................................................. B25G 1/00
[52] U.S. Cl. .................................. 16/421; 16/422; 294/57
[58] Field of Search ................................. 294/25, 57, 58, 294/137, 166, 171; 2/20, 159, 160; 16/110 R, 111 R, 114 R, 116 R, 405–407, 421–428; 74/551.9, 558.5; 224/218, 901.2, 901.8; 482/93, 105, 106, 108, 139

[56] References Cited

U.S. PATENT DOCUMENTS

| | | | |
|---|---|---|---|
| 3,368,811 | 2/1968 | Finney | 294/25 X |
| 4,262,385 | 4/1981 | Norman | 294/171 X |
| 4,504,980 | 3/1985 | Butcher | 294/25 X |
| 4,932,702 | 6/1990 | Sweeny | 294/171 |
| 5,083,825 | 1/1992 | Bystrom et al. | 294/171 |
| 5,348,360 | 9/1994 | Mencarelli et al. | 294/57 |
| 5,511,445 | 4/1996 | Hildebrandt | 16/116 R X |

FOREIGN PATENT DOCUMENTS

| | | | |
|---|---|---|---|
| 3509679 | 9/1986 | Germany | 294/171 |

*Primary Examiner*—Johnny D. Cherry
*Attorney, Agent, or Firm*—Gregory J. Nelson

[57] ABSTRACT

A resilient cushioning grip for use on various handles which is readily applied, removable, or transferable to another handle without disassembly of connected parts integral with the handles. The grip provides a firm, safe surface for the user's hands eliminating the need for gloves or resin powder. The grip preferably comprises an extruded resilient pad, rectangular in shape having a hook and loop fastener system. The grip is wrapped around and securely attached to the handle, such as the bar of weight lifting equipment and handles of bicycles, health care equipment, lawn and garden tools, hand tools and other items.

8 Claims, 2 Drawing Sheets

U.S. Patent        Dec. 28, 1999        Sheet 1 of 2        6,006,403
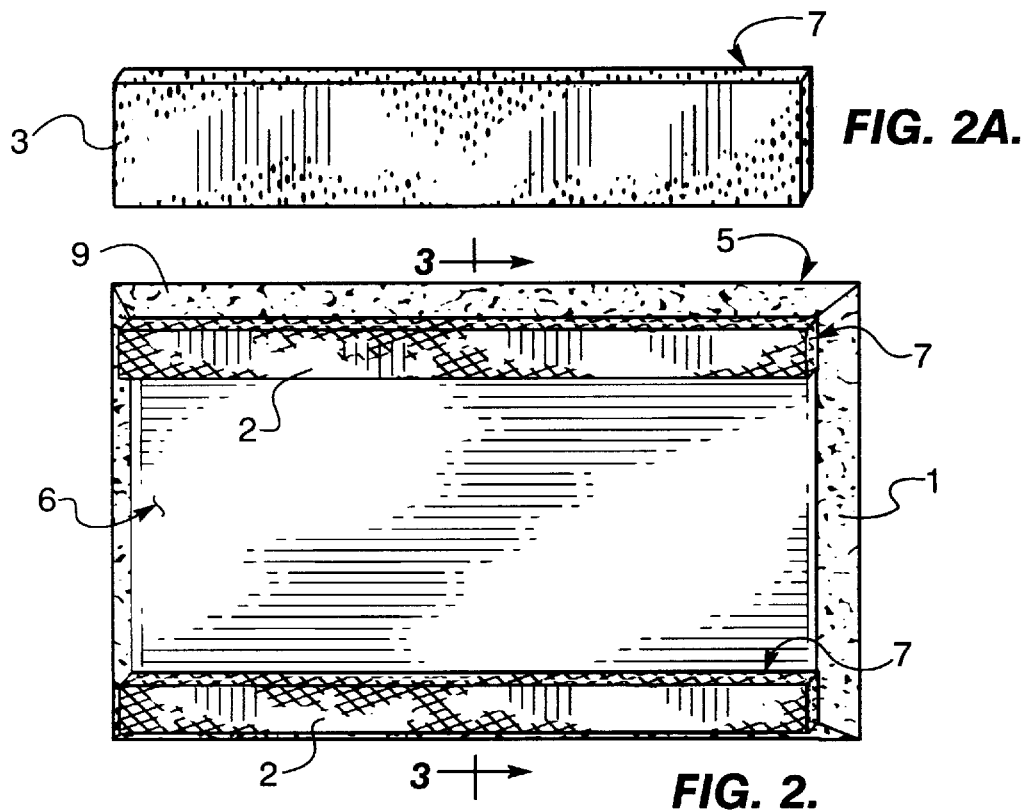
FIG. 2A.
FIG. 2.
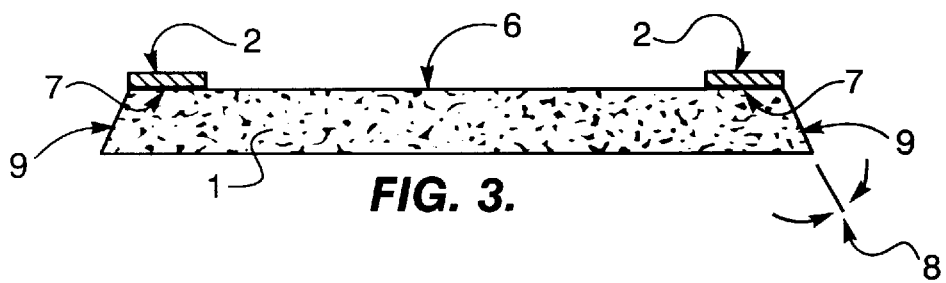
FIG. 3.
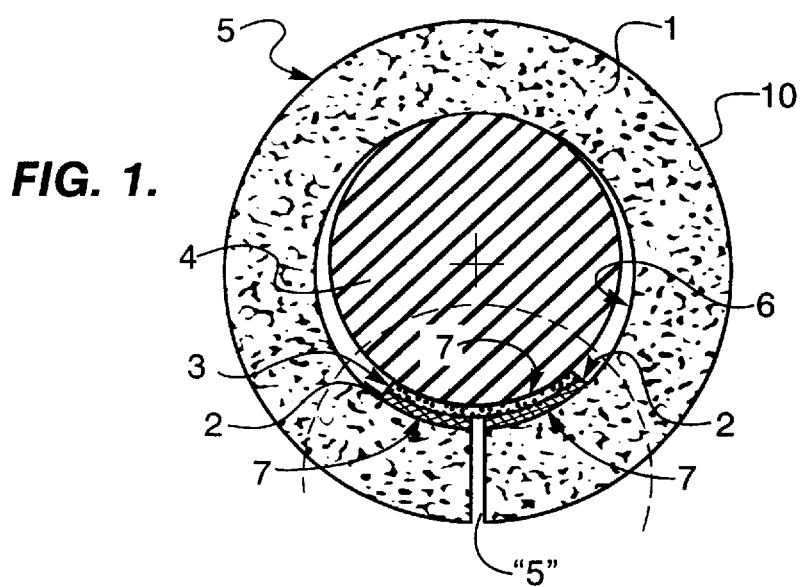
FIG. 1.

TRANSFERABLE REPLACEABLE RESILIENT CUSHIONING GRIP FOR USE ON HANDLES

BACKGROUND OF THE INVENTION

1. Field of the Invention

The present invention relates to a removable and transferable resilient grip for use on handles and bars of various types, such as bars used by weight lifters to hold weights which bars are of various sizes so that progressive resistance exercising can be performed. The grip wraps around the bar or handle and is held in place by an adhesively attached hook and loop fastener such as the type sold under the trademark VELCRO® fasteners. The use of grips according to the invention obviates the need for gloves to maintain a safe and firm grasp. Gloves may typically become slick during use and wet from the user's perspiration, making maintenance of a firm grasp on the bar or handle difficult.

Grips according to the present invention may also be used on various other sports-related and household products and tools to provide a firm grip on the handle and to reduce the formation of callouses and blisters. When the grips are brightly colored, they enhance visibility and increase safety when used on bicycles and all-terrain vehicles. Bright coloration also lessens the chance of losing items such as small tools such as trowels, picks, hoes and other garden tools when they are lying in the grass.

2. Brief Description of the Prior Art

Weight-lifting bars are frequently knurled in the area where the user grips the bar in order to reduce slippage between the hands and the bar. When exercising in warm weather or in heated gymnasiums, the user's hands may rapidly become damp due to perspiration and knurling becomes ineffective to reduce slippage. Gloves have been and are being used to increase gripping power, but they tend to become slick with use and further encourage perspiration and prevent evaporation of moisture from the skin.

Other devices designed to make the gripping of a bar safer and more secure are known in the art. Specifically, Troutman, U.S. Pat. No. 5,752,731, teaches a grip system that moves axially on the bar to facilitate gripping while performing lifts that require movement of the hands relative to each other during the exercise, but does not address maintaining a firm grip during use.

Oren, U.S. Pat. No. 5,407,405, teaches a grip assembly which enables free movement of the wrists and hands in order to meet requirements of a specific exercise, but does not address maintaining a firm grip as the user perspires during repeated lifts. With respect to prior art grips for bicycle handles and handles on all-terrain vehicles, these grips are usually provided on the vehicle when purchased and slip over the ends of the handles. The material of these grips is generally a semi-hard rubber or plastic or in the case of sport bikes, may consist of long narrow strips of plastic which are wound in overlapping fashion along the entire length of the handlebar to provide a gripping surface. Household and garden tools having bar-shaped handles are usually made of hardwoods or for kitchen use may be of hard plastic.

BRIEF SUMMARY OF THE INVENTION

It is a broad object of the present invention to provide a resilient grip that is easily attachable to a handle or bar in order to provide a firm safe hand grip without the further use of adjuncts such as gloves or resin powder.

It is also a primary purpose of said invention to provide a grip that can be readily replaced in case of extensive wear after repeated use or which can be readily transferred to another handle thereby providing increased utility and versatility. Removing and replacing of the grips may be accomplished without disassembly of any other adjacent or connected parts integral with said handles. Therefore, the grips may be used to replace worn or damaged grips on existing items.

It is a further object of said invention to provide a grip for a handle having a highly colorful surface which increases visibility and also adds appeal. The increased visibility reduces the possibility that garden tools and fishing rods and the like might be lost when placed in high grass.

BRIEF DESCRIPTION OF THE INVENTION

Various grip devices have been disclosed by other inventors, primarily to assist in the ergonomics of a useful grip on weight-lifting equipment. However, these devices do not address the problems involved with continuous exercises ("repetitions") which cause perspiration to form on the hands rendering the wearing of gloves and mechanical knurling on the gripping surface ineffective. Others have taught the use of foam rubber on the gripping surface, but these do not allow ready replacement of the grips after extreme use and subsequent wear since they are formed on the handle or bar at the time of manufacture.

"Slip-on" foam rubber grips which are formed in a cylindrical shape are also known. These grips require an almost perfect fit and are designed for use on handles having a very limited range of diameters, or in the case of non-round broad handles, a limited range of perimeters of the handle cross-section. The present invention utilizes a resilient material such as foam rubber which is extruded as a cylinder and then slit lengthwise to form a rectangle. The grips thus formed are held in place on handles of various types by utilizing a detachable attachment system using hook and loop fasteners such as that commonly known as VELCRO® fasteners. The grips are attached to handles in this manner and are easily transferable to other handles or may be quickly replaced when they become worn after repeated use.

The invention will be more fully understood from the following description, claims and drawings in which:

BRIEF DESCRIPTION OF THE DRAWINGS

FIG. 1 is a cross-sectional view of the preferred embodiment of the invention shown attached to a typical handle;

FIG. 2 is a bottom view of an alternate embodiment of the invention showing the resilient pad with attached "hook" fastener strips along each longitudinal side of the pad, adhesively attached to the smooth closed cell inner surface of the pad;

FIG. 2A is a longitudinal view of the fastener strip which is applied to the handle;

FIG. 3 is a transverse cross-sectional view of the grip of the embodiment shown in FIG. 2 taken along line 3—3 showing the "hook strips" attached along the longitudinal edges of the grip, the adjunct "loop strip" is also shown in cross-section in this view;

DETAILED DESCRIPTION OF THE INVENTION

Figure 4:
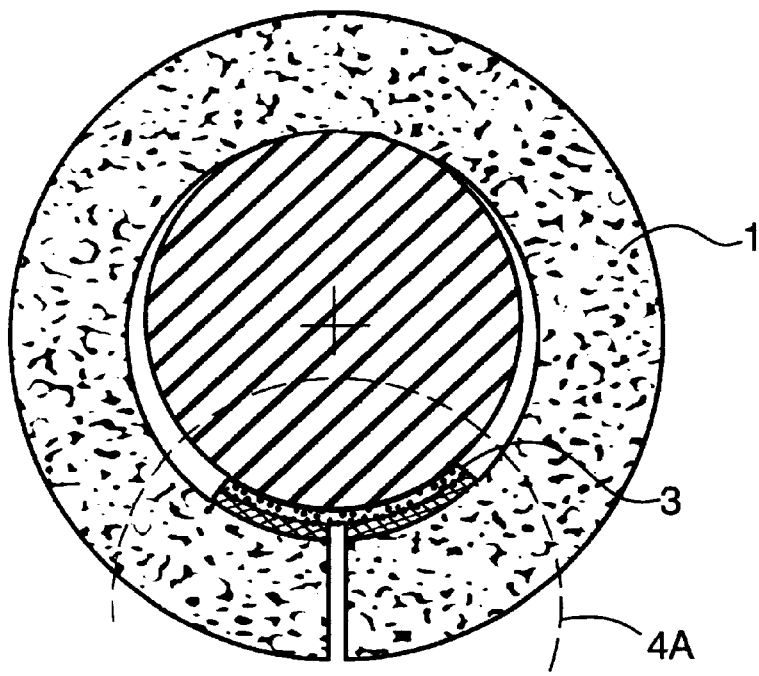
FIG. 4 is a cross sectional view showing the grip according to the invention applied to the handle showing the location of the adhesive layers and the inner relationship of the fastener strips.
Figure 4A:
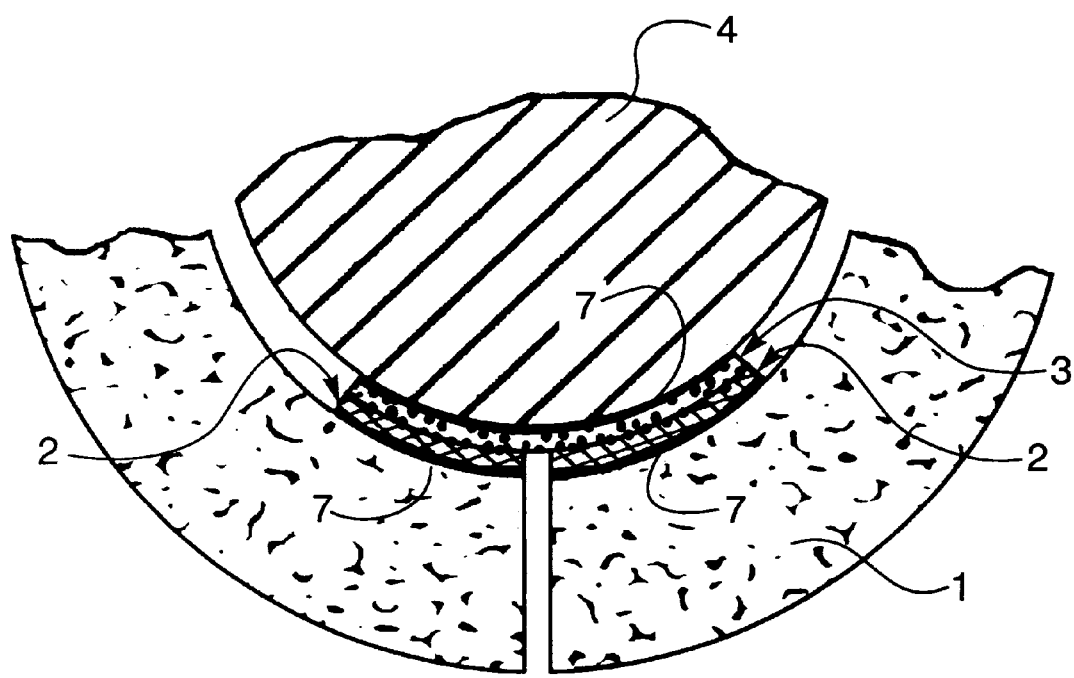
FIG. 4A is an enlarged view of a portion of FIG. 4 as indicated by the circle portion of FIG. 4.

In the preferred embodiment of the present invention shown in FIG. 1, the grip is fabricated from a resilient material such as an extruded elastomeric cylinder with the inner surface being a closed cell construction that is smooth without surface irregularities. Preferably, the outside surface is closed cell construction which may be shaved so as to present a roughened texture. In the preferred embodiment, a cylinder is extruded and is approximately 3/16" thick, having an inside diameter of 1 1/8". The material has a density of approximately 12 pounds per cubic foot. Those versed in the art will recognize that the thickness of the material may vary from 1/8" to 5/16" and that the inside diameter of the cylinder may vary from about 7/8" to 1 5/16". The material after extrusion may weigh between 10# and 15# per cubic foot. After extrusion, the cylinder is slit lengthwise into a rectangular pad having a length preferably between 4" to 5 1/2". Preferred materials are natural or synthetic rubber or an elastomer.

Once slit and cut to length, each grip is provided with a detachable attachment system using a loop and hook fastener system. Two narrow strips of material commonly called "hook strips" are adhered along the two long slit edges of the grip on the smooth inside surface. One hook strip is attached along each of the two slit edges of the grip. A "loop strip" is also provided as part of the attachment system which loop strip has the same length as the aforementioned hook strip, but preferably is wider, typically at least twice as wide. The loop strip is provided with a strong adhesive on the obverse side from the loop surface to facilitate attachment to the handle on which the grip is to be used. The loop strip is attached to the handle on which the grip is to be used. The loop strip is attached to the handle surface in a manner parallel to the axial dimension of the handle, and positioned precisely where the user wishes to utilize the grip. Once the loop strip has been secured in place, one long edge of the pad is attached to the loop strip using the loop strip bonded on that edge, covering only half of the loop strip's width and leaving the other half exposed. The material is then wrapped around the handle until the other long edge with its bonded hook strip can be attached to the remaining half of the loop strip already on the handle. Minor differences in the dimension of the handle cross-section as compared to the short or narrow dimension of the grip can be compensated for by utilizing narrow strips of suitable material having a length equal to the length dimension to the loop fastener on the handle. A suitable material would be any thin piece of cloth, plastic, foam rubber or aluminum foil, or similar material that is flexible and can be readily cut into strips. These strips will be referred to as "shims". Should the handle diameter be too large, the material can be stretched at installation to compensate for approximately 5/8".

An alternate embodiment of the present invention utilizes a rectangular shaped piece of material approximately 3/16 thick and weighing approximately 12 pounds per cubic foot. The material thickness may vary from 1/8" to 5/16" and may weigh between 10# and 15# per cubic foot without exceeding the scope and intent of the present invention. One surface of the material such as a natural or synthetic rubber has a closed cell construction, that is the surface is smooth and free of irregularities, while the other side is shaved so as to present a rougher surface suitable for gripping with the hands.

In the second embodiment, the length dimension of the foam rubber pad is typically approximately 4 5/8" and the width dimension, which relates to the cross-section perimeter of the handle on which the grip will be used, is typically from 3 1/4" to 4 1/4". These dimensions facilitate use on circular handles having diameters of between 15/16" to 1 1/4".

The short side of the rectangular pad is typically trimmed at an angle of between 30° to 50° so that the outside dimension of the pad (as measured on the closed cell or rough side) is slightly greater than the inside dimension to allow a smoother fit at the intersection of the two long edges when the grip is wrapped around a handle or bar. The outside surface of the grip thus described is typically 4 1/16" in length after trimming but may vary from 3 3/4" to 4 3/4". The grip of this embodiment is equipped with a hook and loop fastener system in the same manner as described for the preferred embodiment above and is applied to a handle in the identical fashion as described in the preferred embodiment.

DETAILED DESCRIPTION OF THE DRAWINGS

Referring to the drawings in which the same numerals are used throughout to identify the same or similar components, FIG. 1 shows a cross-sectional view of the preferred embodiment of the present invention attached to a typical bar-shaped handle, also shown in cross-section. The grip comprises a resilient pad 1 and fastener components. The pad 1 is wrapped around the handle 4 and securely in place by the engagement of the fasteners loop strip 3 with the two fastener hook strips 2. The edges of the pad may abut or may be slightly spaced apart at "S". The resilient pad material facilitates some stretching about the handle 4. Loop strip 3 is adhesively attached to the handle 4 and extends axially along the handle at the desired location. An adhesive layer 7 secures the loop strip in place. The outer surface 5 of the pad 1 is in contact with the hands of the user and provides cushioning and reduces slipping and the inner surface 6 engages the handle.

FIG. 4 is an enlarged view of a portion of FIG. 1 as shown depicting a clearer view of the location of the adhesive layers 7 and the interrelationship of the loop strip 3 and the hook strips 2 to each other and to the foam rubber grip 1 and the handle 4 on which the grip 1 is used. The pad material may be either a natural or synthetic polymeric material such as foam rubber, neoprene, EPPM, or other resilient material which preferably is porous to provide breathability and cushioning.

FIGS. 2 and 3 show another embodiment of the invention in which the hook strips 2 are attached to the edges of a resilient pad 1 using the adhesive layers 7 on the smooth inside surface 6 of the pad. The adjunct loop strip 3 is also shown with an adhesive layer 7 which is used to attach the strip to a handle on which the grip 1 will be used.

FIG. 3 is a cross-sectional view of a resilient pad 1 of the embodiment of FIG. 2 showing the hook strip 2 attached to the smooth inner surface 6 of the grip 1 through the use of the adhesive layers 7. The adjunct loop strip 3 is also shown with its adhesive layer 7 for attachment to a bar or handle. The edge 9 is cut at an angle of approximately between 30° to 50° to achieve a better fit of these edges when they meet as the grip 1 is attached to a bar. A preferred angle for the edge 9 is 40°.

It will be obvious to those skilled in the art to make various modifications, alterations and changes to the invention described herein. To the extent these modifications, alterations and changes to do not depart from the spirit and scope of the invention, they are intended to be encompassed therein.

I claim:

1. A replaceable and transferable grip which is readily applied to or removable from a handle having a circumference, said grip comprising:
   (a) a generally rectangular pad having opposite inner and outer surfaces and opposite sides and ends;
   (b) a strip of a first fastener material adhesively attached along the two sides of the pad at the inner surface and having a length extending substantially along the length of said sides; and
   (c) a section of a second fastener material approximately equal in length to the length of the first fastener material and a width substantially less than the circumference of the handle and having an adhesive located on one side thereof for attachment to a handle on which the grip is to be used whereby the pad can be wrapped about a handle and the first and second fastener materials engaged.

2. The grip of claim 1 wherein the pad is formed from a cylinder of resilient material and split with the diameter of the cylinder being approximately ⅞" to 1–5/16" and the cut length of the cylinder being approximately 4" to 5–½".

3. The grip of claim 2 wherein the resilient material has a thickness of approximately ⅛" to 5/16" and is foam rubber which weighs approximately 10# to 15# per cubic foot.

4. The grip of claim 1 wherein the sides of the pad are trimmed to an angle of approximately 30° to 50° from vertical.

5. The grip of claim 1 wherein the inner surface of the rectangular pad has a closed cell surface, that is smooth and free from surface irregularities and the outer surface has a closed cell rough surface.

6. The grip of claim 1 wherein the first fastener material is a fabric hook material approximately ⅝" in width and the second fastener material is a fabric loop material approximately 1" in width.

7. The grip of claim 1 having at least a highly colored outer surface to provide increased visibility for equipment or tools on which said grip may be used.

8. The grip of claim 1 wherein said pad is of a material selected from the group consisting of natural rubber, synthetic rubber and resilient polymeric material.

* * * * *